United States Patent
Araki et al.

[11] Patent Number: 5,714,223
[45] Date of Patent: Feb. 3, 1998

[54] RETROREFLECTIVE SHEET AND ARTICLE HAVING RETROREFLECTIVENESS

[75] Inventors: Yoshinori Araki, Tendo; Masami Yokoyama, Onishida, both of Japan

[73] Assignee: Minnesota Mining and Manufacturing Company, St. Paul, Minn.

[21] Appl. No.: 636,052

[22] Filed: Apr. 22, 1996

[30] Foreign Application Priority Data

May 12, 1995 [JP] Japan ................................. 7-114525

[51] Int. Cl.$^6$ .................... B32B 1/04; G02B 5/122
[52] U.S. Cl. .................... 428/68; 428/421; 428/520; 428/913; 359/529
[58] Field of Search .................... 428/156, 68, 172, 428/913, 147, 212, 340, 421, 520; 359/529, 536, 541

[56] References Cited

U.S. PATENT DOCUMENTS

| | | | |
|---|---|---|---|
| 3,190,178 | 6/1965 | McKenzie | 88/82 |
| 3,684,348 | 8/1972 | Rowland | 350/103 |
| 4,025,159 | 5/1977 | McGrath | 350/105 |
| 4,348,312 | 9/1982 | Tung | 428/144 |
| 4,444,826 | 4/1984 | Sasaki et al. | 428/216 |
| 4,588,258 | 5/1986 | Hoopman | 350/103 |
| 4,637,950 | 1/1987 | Bergeson et al. | 428/168 |
| 4,653,854 | 3/1987 | Miyata | 350/105 |
| 4,896,943 | 1/1990 | Tolliver et al. | 350/105 |
| 5,069,964 | 12/1991 | Tolliver et al. | 428/325 |
| 5,132,164 | 7/1992 | Moriya et al. | 428/199 |

FOREIGN PATENT DOCUMENTS

| | | | |
|---|---|---|---|
| 0 459 720 A1 | 12/1991 | European Pat. Off. | B32B 27/08 |
| 0 672 920 A1 | 9/1995 | European Pat. Off. | G02B 5/128 |
| 0672920 | 9/1995 | European Pat. Off. | |
| 52-21793 | 2/1977 | Japan | G09F 13/16 |
| 56-51907 | 7/1981 | Japan | |
| 56-51907 | 12/1981 | Japan | B32B 27/30 |
| 58-205765 | 12/1981 | Japan | |
| 58-205764 | 11/1983 | Japan | B32B 27/30 |
| 61-29874 | 7/1986 | Japan | B32B 27/30 |
| 1-262133 | 10/1989 | Japan | B32B 27/30 |
| 2-72945 | 3/1990 | Japan | |
| 2-196653 | 8/1990 | Japan | B32B 27/14 |
| 3-288640 | 12/1991 | Japan | B32B 27/30 |
| 5-131589 | 5/1993 | Japan | |
| 6-80794 | 3/1994 | Japan | C08J 5/18 |

*Primary Examiner*—Donald Loney

[57] ABSTRACT

A retroreflective article that comprises:

(a) a retroreflective layer having first and second major surfaces, and (b) a cover layer juxtaposed against the first major surface, characterized in that:

the cover layer comprises a surface layer, an optional intermediate layer, and a back layer, with the provisos that: (i) when the intermediate layer is present in the cover layer the intermediate layer contains a vinylidene fluoride base polymer as a primary component, and the surface layer and back layer each comprise a methyl methacrylate base polymer as a primary component; and (ii) when the intermediate layer is absent from the cover layer, the surface layer comprises a methyl methacrylate base polymer (A) and a vinylidene fluoride base polymer (F) in a weight ratio A:F of 55:45 to 95:5, and the back layer comprises a methyl methacrylate base polymer and a vinylidene fluoride base polymer with the vinylidene fluoride base polymer being the primary component.

12 Claims, 1 Drawing Sheet

RETROREFLECTIVE SHEET AND ARTICLE HAVING RETROREFLECTIVENESS

TECHNICAL FIELD

The present invention relates to an improvement of a retroreflective sheet. In particular, the present invention relates to a retroreflective sheet that is bonded to an article such as a plate of a traffic sign, a plate of a guidepost and so on, to impart the retroreflectiveness to the article. Further, the present invention relates to such article having the retroreflectiveness.

BACKGROUND

With a traffic sign or a guidepost, a retroreflective sheet utilizing a retroreflective property, that is, a property of reflecting a light beam in a direction reverse to a direction of light incidence, is widely used.

As such sheet, there are known an enclosed lens retroreflective sheet (disclosed in, for example, JP-A-5-131589, etc.), an encapsulated lens type retroreflective sheet (disclosed in, for example, JP-A-3-9837, etc.), a prismatic retroreflective sheet (disclosed in, for example, JP-A-60-100103, etc.), and so on. While these retroreflective sheets (hereinafter referred to as "reflective sheet" sometimes) have different structures of the retroreflective layer, they have a cover layer on the retroreflective layer to protect the latter. As the cover layer, a resinous film having light transparency is known.

As the resinous film to be used as the cover layer, the following films are known:

For example, from JP-B-40-7870, JP-A-52-21793, JP-A-52-110592, JP-A-60-194405 and JP-A-2-196653, there are known reflective sheets having a cover layer made of a film which essentially consists of a single layer of an acrylic polymer (e.g. polymethyl methacrylate, etc.), a polyester polymer (e.g. polycarbonate, polyethylene terephthalate, etc.), a cellulose ester polymer (e.g. cellulose acetate, etc.), and the like. Among them, the acrylic polymer is used when the reflective sheet is used outdoors since it has good weatherability. But, since the single layer film of the acrylic polymer is relatively rigid and fragile, its impact resistance is low. In the case of a reflective sheet which has been processed by cutting or punching out in a determined size and shape and adhered to an article, the cover layer is broken from the processed edge pans as if it were chipped, and finally, the breakage often extend to the retroreflective layer. To express a degree of resistance to the breakage of edge pans, a term "resistance to edge chipping" will be used.

As disclosed in JP-A-61-255846, a reflective sheet is known, which uses, as a cover layer, a film of an acrylic polymer comprising an acrylic multi-phase interpolymer blend which is one of the acrylic polymer having improved impact resistance. However, such film cannot improve the impact resistance and resistance to edge chipping at a satisfactory level.

As disclosed in IP-A-63-307940, a reflective sheet is known, which uses, as a cover layer, a film of an ionomer or an ethylene base copolymer such as an ethylene-acrylic acid copolymer. While such film has practically satisfactory impact resistance and resistance to edge chipping, it suffers from decrease of weatherability, in particular, film coloring caused by ultraviolet ray.

As disclosed in JP-A-6-138312, a reflective sheet is known, which uses, as a cover layer, a film of a fluoropolymer such as polyvinylidene fluoride. This film is excellent in impact resistance and resistance to edge chipping and has a property that its surface is hardly stained. But, since this film has low adhesion to the retroreflective layer and a print layer formed on the cover layer, abrasion loss of the print layer or delamination of the cover layer from the retroreflective layer happen, and then the practical durability of the sheet is low.

A surface protective film comprising both the fluoropolymer such as polyvinylidene fluoride and the acrylic polymer such as polymethyl methacrylate is disclosed in several publications, for example, IP-B-56-51907, IP-A-57-142359, JP-A-57-187248, JPA-58-205764, JP-B-61-29874, JP-A-1-262133, JP-A-2-72945, JP-A-3-124754, JP-A-3-288640, and JP-A-6-80794. The disclosed films are (i) A blend film comprising a fluoropolymer as a primary component and an acrylic polymer as a secondary component, (ii) A laminate film comprising outer surface layers which consist essentially of a fluoropolymer and an inner layer which consists essentially of an acrylic polymer and is not exposed outside.

(iii) A laminate film comprising outer surface layers of a blend films which comprises a fluoropolymer as a primary component and an acrylic polymer as a secondary polymer, and an inner layer of a blend film which comprises an acrylic polymer as a primary component and a fluoropolymer as a secondary component.

Since the fluoropolymer such as polyvinylidene fluoride has high transparency and does not have an absorbance wavelength in the UV light range, it has excellent weatherability. In addition, since it has relatively high flexibility, it is suitable for use in a place where impact resistance is required. For example, it is used as a surface protective film of an article made of plastics, rubbers, metals, glass or wood.

The outer surface layer of the surface protective film contains, as a primary component, the fluoropolymer to improve the stain-proofing property of the film surface. When such surface protective film is used as a cover layer of the reflective sheet, adhesion of the surface layer of the cover layer to the retroreflective layer and the print layer is poor, and therefore, the practical durability of the sheet cannot be improved. Further, the above surface protective film has inferior resistance to edge chipping to the film of the fluoropolymer alone. Then, the improvement of resistance to edge chipping is desired. In particular, in the case of a reflective sheet which is used on a plate of a traffic sign, a plate of a guidepost and so on together with a print layer formed thereon, the above improvement is immediately required.

An object of the present invention is to provide a retroreflective sheet which has good adhesion of a coating layer to a retroreflective layer and a cover layer and therefore good practical durability, and is excellent in impact resistance and weatherability as well as resistance to edge chipping.

Another object of the present invention is to provide an article having a retroreflectiveness as one of the preferred applications of such retroreflective sheet.

According to a first aspect of the present invention, there is provided a retroreflective sheet comprising a retroreflective layer which retroreflects a light beam which is illuminated from one of major surfaces of the retroreflective layer, and a cover layer coated on said one of major surfaces, characterized in that said cover layer comprises a surface layer and a back layer which is present on a side facing said one of major surfaces, and said surface layer comprises a methyl methacrylate base polymer (A) and a vinylidene fluoride base polymer (F) in a weight ratio (A:F) of from 55:45 to 95:5.

In this first invention, since the cover layer comprises a surface layer and a back layer which is present on a side facing one of the major surfaces of the retroreflective layer, and the surface layer comprises a methyl methacrylate base polymer (A) and a vinylidene fluoride base polymer (F) in a weight ratio (A:F) of from 55:45 to 95:5, the cover layer has good adhesion to the retroreflective layer and the print layer formed on the surface layer and therefore good practical durability and the retroreflective layer is excellent in resistance to edge chipping.

When the content of the methyl methacrylate base polymer is smaller than the above range, the adhesion of the cover layer to the reflective layer and the cover layer is worsened. When, the content of the methyl methacrylate base polymer is larger than the above range, the resistance to edge chipping is deteriorated.

Since the back layer is provided between the surface layer of the cover layer and the retroreflective layer, the resistance to edge chipping is improved in cooperation with the effect of the weight ratio of the polymers in the surface layer.

According to a second aspect of the present invention, there is provided a retroreflective sheet comprising a retroreflective layer which retroreflects a light beam which is illuminated from one of major surfaces of the retroreflective layer, and a cover layer coated on said one of major surfaces, characterized in that said cover layer comprises, in this order, a surface layer, an intermediate layer and a back layer which is present on a side facing said one of major surfaces, said surface layer comprises a methyl methacrylate base polymer as a primary component, and said intermediate layer comprises a vinylidene fluoride base polymer as a primary component.

In this second invention, since the cover layer comprises, in this order, a surface layer, an intermediate layer and a back layer which is present on a side facing said one of major surfaces, the surface layer comprises a methyl methacrylate base polymer as a primary component, and the intermediate layer comprises a vinylidene fluoride base polymer as a primary component, the cover layer has good adhesion to the retroreflective layer and the print layer formed on the surface layer and therefore good practical durability, and the retroreflective layer is excellent in resistance to edge chipping.

Since the back layer is provided between the surface layer of the cover layer and the retroreflective layer, the resistance to edge chipping is improved in cooperation with the effect achieved by the structure having the surface layer and the intermediate layer.

It is preferred for further improvement of the resistance to edge chipping to form the intermediate layer from the methyl methacrylate polymer (A) and the vinylidene fluoride base polymer (F) in a weight ratio of from 5:95 to 45:55.

In the second invention, the formation of the surface layer from the methyl methacrylate polymer (A) and the vinylidene fluoride base polymer (F) in a weight ratio of from 55:45 to 95:5 further increases the resistance to edge chipping while further improving the adhesion of the cover layer to the print layer.

In the first and second inventions, the formation of the back layer from the methyl methacrylate polymer (A) and the vinylidene fluoride base polymer (F) in a weight ratio of from 55:45 to 95:5 enables the formation of the print layer with good adhesion on the side of the back layer which side is laminated on the retroreflective layer in addition to the further improvement of the adhesion to the retroreflective layer and the resistance to edge chipping.

The above cover layer is excellent also in impact resistance and weatherability, since it comprises a blend layer containing the methyl methacrylate base polymer and the vinylidene fluoride base polymer, or a laminate of a layer comprising the methyl methacrylate base polymer as the primary component and a layer comprising the vinylidene fluoride base polymer as the primary component, or both of the blend layer and the laminate.

It is preferred for the, cover layer to have a transmission to all light of at least 90% for the purpose of increasing a reflection luminance and stability of the reflection luminance with time (retention of reflection luminance).

When the reflective sheet of the first and second invention is an encapsulated lens retroreflective sheet having a retroreflective layer which comprises lens means made of plural transparent microspheres, a support member in which the lens means is partly embedded, a bonding layer having plural linking parts which are bonded to the cover layer so that spaces for encapsulating the transparent microspheres are formed between the cover layer and the bonding layer, and reflectors which are present with contacting the lens means, the resistance to edge chipping which is particularly important in the encapsulated lens retroreflective sheet is improved, and the retroreflective sheet has good adhesion of the cover layer to the retroreflective layer and the print layer and is excellent in the impact resistance and weatherability so that the sheet has good practical durability.

When the retroreflective sheet of the first or second invention is used in an article comprising an article body and a retroreflective sheet which is processed by cutting or punching out in a desired size and shape and adhered to the article body with adhering means such as an article used outdoors, for example, a plate of a traffic sign, a plate of a guidepost and so on, the above described good practical properties of the sheet can be imparted to the article.

Components of the retroreflective sheet of the present invention will be explained further in detail.

DETAILED DESCRIPTION OF THE INVENTION

Retroreflective Layer

Figure 1:
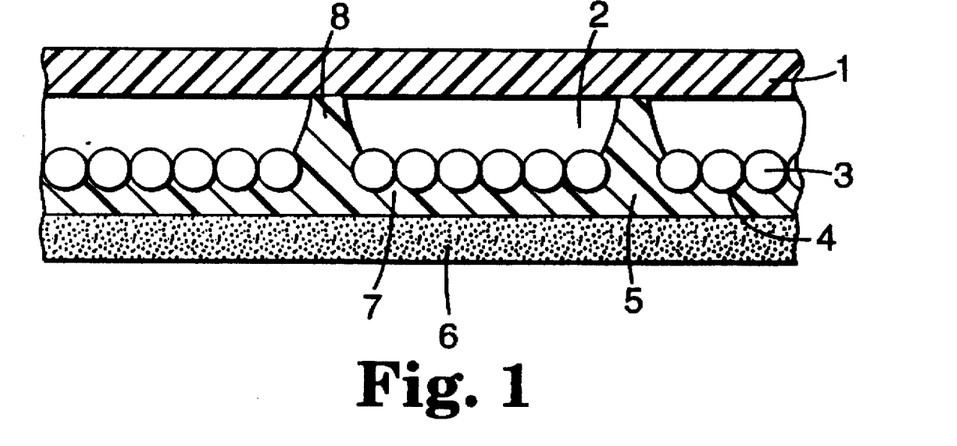
FIG. 1 shows an encapsulated lens retroreflective sheet according to the present invention.

As the retroreflective layer, one of the following retroreflective layer may be preferably used:

(a) "An encapsulated lens retroreflective layer" which comprises lens means made of plural transparent microspheres 3, a support member 7 in which the lens means is partly embedded, a bonding layer 5 having plural linking parts 8 which are bonded to the cover, layer 1 so that spaces 2 for encapsulating the transparent microspheres are formed between the cover layer and the bonding layer, and reflectors 4 which are present with contacting the lens means, and is used in the encapsulated lens retroreflective sheet, as shown in FIG. 1. In FIG. 1, numeral 6 stands for an adhesive layer.

Figure 2:
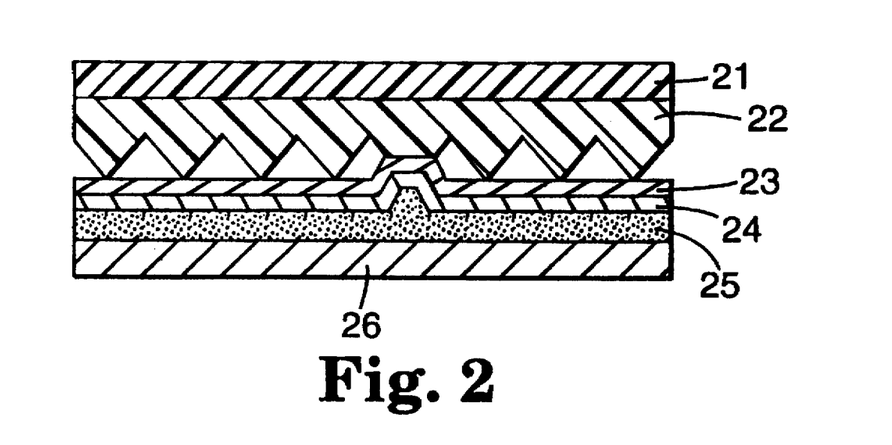
FIG. 2 shows a prismatic retroreflective sheet according to the present invention.

(b) "A prismatic retroreflective layer" which comprises a prism member 22 having a flat surface and plural triangular protrusions for reflecting the incident light back to the incident direction, on a surface opposite to the flat surface, and is used in the prismatic retroreflective sheet as shown in FIG. 2, which comprises a cover layer 21, a prism member 22, a coloring layer 23, a primer layer 24, an adhesive layer 25, and a releasing layer 6 (e.g. a liner or a release paper).

(c) "An enclosed lens retroreflective layer" which comprises lens means made of plural transparent microspheres, a resinous layer in which the lens means is wholly embedded and which is adhered to the cover layer on substantially its whole surface, and reflectors which are present at a certain distance from the lens means, and is used in an enclosed lens retroreflective sheet.

Among them, the retroreflective layers (a) and (b) are preferred since a relatively high reflection luminance and good retention of the reflection luminance are easily achieved. In view of the easy production of the highly flexible reflective sheet, the retroreflective layer (a) is preferred. The high flexibility of the reflective sheet prevents peeling off of the reflective sheet from its edge when the sheet is adhered to an article an edge of which is bent to have a round edge such as the traffic sign plate.

Transparent Microspheres

As the transparent microspheres, glass beads or plastic beads having a desired refractive index may be used, a desired refractive index is usually from 1.4 to 2.7.

When the retroreflective layer is the encapsulated lens retroreflective layer (a), the refractive index is preferably from 1.6 to 2.3. When the refractive index is outside this range, the retroreflectiveness may be lost. That is, an amount of light which is retroreflected in the direction of the incident light is decreased, while an angle of observation of the reflected light is widened. Widening of the angle of observation to some extent may be used in a retroreflective sheet of a wide angle of observation type, which widens the angle of observation with maintaining the reflection luminance in an acceptable range. However, if the angle of observation is too large, the reflection luminance is decreased to a practically unpreferred level. Then, the more preferred refractive index is in the range between 1.9 and 2.1.

When the retroreflective layer is the enclosed lens retroreflective layer (c), the refractive index of the microspheres is preferably at least 2.0, more preferably at least 2.1. When the refractive index is too small, since the distance between the transparent microspheres and the reflection layer should be made large, it is difficult to decrease a total thickness of the reflective sheet. Theoretically, if the transparent microspheres having the refractive index of about 2.8 were used, the transparent microspheres and the reflection layer could be placed very closely. However, it is hardly possible to produce microspheres having such high refractive index.

A diameter of the microsphere is usually from 10 to 200 μm, preferably from 20 to 150 μm, more preferably from 25 to 80 μm. When the diameter is too small, it is difficult to produce microspheres having a uniform diameter and a uniform refractive index, and the reflection luminance of the reflective sheet comprising such microspheres tends to decrease and the retroreflectiveness tends to deteriorate. When this diameter is too large, the thickness of the reflective sheet may increase, and for example, it may be difficult to prevent the peeling off of the reflective sheet from the round edge of the article.

Two or more kinds of the transparent microspheres having different refractive indexes may be used in combination, or two or more types of the transparent microspheres having different diameters may be used in combination.

When the transparent microspheres are colored by a colorant with maintaining the light transparency, reflected light has a different color from that of the incident light.

Prism Member

The prism member of the prismatic retroreflective layer (b) comprises a flat surface through which the incident light enters, and plural triangular pyramid elements which totally reflect the incident light effectively in the direction reverse to the incident direction. The prism member is preferably made of a polycarbonate resin, an ionomer resin or an acrylic resin, in view of mechanical strength, light reflectance, and so on. To provide good retroreflectiveness and a wide angle of observation, a length of one side of the bottom of each triangular pyramid is preferably from 0.1 to 3.0 mm. A thickness of the prism member, namely a distance from the top of the pyramid to the flat surface is preferably from 50 to 500 μm. When this thickness is less than 50 μm, the mechanical strength is decreased, and the height of the triangular pyramid may not reach the desired value, so that the retroreflectiveness is decreased. When this thickness is larger than 500 μm, the total thickness of the reflective sheet is too large, so that it may be difficult to prevent the peeling off of the reflective sheet from the round edge of the article.

The prismatic retroreflective sheet may comprise, below the prism member, a coloring layer, a primer layer, an adhesive layer and a releasing layer as shown in FIG. 2.

Bonding Layer

The bonding layer of the encapsulated lens retroreflective layer comprises a support member in which the lens means, namely plural transparent microspheres are partly embedded, and plural linking parts which are bonded to the cover layer so that spaces for encapsulating the transparent microspheres are formed between the cover layer and the bonding layer.

The bonding layer comprises at least one polymer selected from polyurethanes, acrylic polymers, polyesters, polyvinyl chloride polymers, polyvinylidene chloride polymers, polyolefins, and so on.

Preferably, the bonding layer comprises the acrylic polymer, since the acrylic polymer is excellent in weatherability, and had a large adhesion strength to the transparent microspheres so that it can hold the microspheres firmly. Further, when the back layer of the cover layer comprises the methyl methacrylate base polymer and the vinylidene fluoride base polymer in the above weight range, the adhesion between the retroreflective layer and the cover layer is readily improved.

The acrylic polymer is preferably a polymer prepared by polymerizing a monomer comprising an alkyl acrylate or an alkyl methacrylate. As the alkyl acrylate or methacrylate, at least one alkyl acrylate or methacrylate an alkyl group of which is one of methyl, ethyl, isopropyl, butyl, isobutyl, isooctyl, 2-methylbutyl, 2-ethylhexyl, lauryl, stearyl, cyclohexyl, isobornyl, 2-hydroxyethyl, 2-hydroxypropyl, 3-chloro-2-hydroxypropyl, hydroxyethoxyethyl, methoxyethyl, ethoxyethyl, dimethylaminoethyl, diethylaminoethyl and glycidyl can be used. The monomer may additionally contain a copolymerizable monomer such as acrylic acid, methacrylic acid, β-hydroxyethyl carboxylate, itaconic acid, maleic acid, fumaric acid, styreno, chlorostyrene, (α-methylstyrene, vinyltoluene, acrylamide, methacrylamide, N-methylolamide, N-methoxymethylacrylamide, vinyl chloride, vinyl acetate, vinyl propionate, acrylonitrile, vinylpyridine, N,N-dimethylacrylamide, N,N-diethylacrylamide, N-acrylmorpholine, N-acrylpiperidine, and the like.

A preferred example of the acrylic polymer is a copolymer prepared by copolymerizing a monomer mixture comprising methyl methacrylate, isooctyl acrylate and ethyl acrylate.

A weight average molecular weight of the acrylic polymer is preferably from 10,000 to 1,000,000, more preferably from 100,000 to 500,000.

The acrylic polymer may be a thermoplastic one or a curable one such as a thermosetting one or a radiation curable one. Preferably, the curable polymer, in particular, the radiation curable polymer is used. When the radiation curable polymer is used, a reactive diluent such as an acrylic monomer is added, whereby flowability of the bonding layer before curing is easily controlled, so that the formation of the encapsulated lens retroreflective layer is made easy. As the result, it is possible to produce the reflective sheet having a uniform and high reflection luminance over the whole surface of the sheet. The reflective sheet using the radiation curable polymer in the bonding layer and its production are disclosed in JPA-52-11059 (=JP-B-61-13561).

A thickness of the bonding layer is usually from 10 to 200 µm, preferably from 20 to 80 µm, more preferably from 30 to 70 µm. When the thickness of the bonding layer is too small, the impact resistance tends to decrease, and the formation of the print layer on the cover layer is difficult after the production of the reflective sheet. When the thickness of the bonding layer is too large, the flexibility of the reflective sheet may be deteriorated, and the formation of the spaces for encapsulating the plural transparent microspheres may be difficult.

The bonding layer may contain, in addition to the above polymer, additives such as a pigment (e.g. rutile titanium dioxide, etc.), a polymerization initiator, a crosslinking agent, an antioxidant, a UV light absorber, a fungicide, an antistatic agent, a higher fatty acid, and so on.

Reflector

As the reflector, a thin film having specular gloss, a reflective resin film containing a pearlescent pigment and the like can be used. The thin film may be formed by a thin film forming method such as vapor deposition from a metal such as aluminum, copper, silver, gold, zinc, etc. or a compound such as $CeO_2$, $Bi_2O_3$, ZnS, $TiO_2$, $CaF_2$, $Na_3AlF_6$, $SiO_2$, $MgF_2$, etc. The reflective resin film may be formed by coating a paint comprising a resin and a pearlescent pigment (e.g. $BiOCl_4$, $PbCO_3$, guanine obtained from fish scales, etc.) on the lens element.

The reflector is formed with contacting the lower half surface of each transparent microsphere in the case of the encapsulated lens retroreflective layer.

A thickness of the reflector is usually from 0.01 to 10 µm, preferably from 0.05 to 5 µm.

The pearlescent pigment may be added to the bonding layer to increase the reflection efficiency of the reflector.

Cover Layer in the First Invention

As explained above, the cover layer used in the first invention comprises the surface layer, and the back layer which is present on the side facing the one of the major surfaces of the retroreflective layer, and the surface layer comprises the methyl methacrylate base polymer (A) and the vinylidene fluoride base polymer (F) in a weight ratio of from 55:45 to 95:5.

The "methyl methacrylate base polymer" is intended to mean a polymer obtained by polymerizing a monomer comprising methyl methacrylate as a major component. A content of methyl methacrylate in the monomer is preferably at least 60% by weight, more preferably at least 90% by weight. When the content of the methyl methacrylate in the monomer is less than 60% by weight, the compatibility between the methyl methacrylate base polymer and the vinylidene fluoride polymer is decreased so that the resistance to edge chipping tends to deteriorate, and the adhesion of the cover layer to the retroreflective layer and the print layer may be worsened.

The monomer for the preparation of the methyl methacrylate base polymer may optionally contain at least one copolymerizable monomer such as a methacrylate other than methyl methacrylate (e.g. ethyl methacrylate, propyl methacrylate, butyl methacrylate, etc.), an acrylate (e.g. methyl acrylate, ethyl acrylate, propyl acrylate, butyl acrylate, etc.), a fluoromonomer (e.g. vinylidene fluoride, hexafluoropropylene, tetrafluoroethylene, trifluorochloroethylene, etc.), and so on.

The methyl methacrylate base polymer may be a graft copolymer comprising a backbone polymer of methyl methacrylate on which the above copolymerizable monomer is graft polymerized.

The "vinylidene fluoride base polymer" is intended to mean a polymer prepared by polymerizing a monomer comprising vinylidene fluoride as a primary component. A content of vinylidene fluoride in the monomer is preferably at least 60% by weight, more preferably at least 90% by weight. When the content of vinylidene fluoride in the monomer is less than 60% by weight, the compatibility between the methyl methacrylate base polymer and the vinylidene fluoride polymer is decreased so that the resistance to edge chipping tends to deteriorate. Further, the impact resistance may be deteriorated, and the reflection luminance may be decreased by the decrease of the transmission of the cover layer to all light.

The monomer for the preparation of the vinylidene fluoride base polymer may optionally contain at least one copolymerizable monomer such as a fluoromonomer except vinylidene fluoride (e.g. hexafluoropropylene, tetrafluoroethylene, trifluorochloroethylene, etc.), a methacrylate (e.g. methyl methacrylate, ethyl methacrylate, propyl methacrylate, butyl methacrylate, etc.), an acrylate (e.g. methyl acrylate, ethyl acrylate, propyl acrylate, butyl acrylate, etc.), and so on.

The vinylidene fluoride base polymer may be a graft copolymer comprising a backbone polymer of vinylidene fluoride on which the above copolymerizable monomer is graft polymerized.

An average spherulite diameter of the vinylidene fluoride base polymer is preferably 1.6 µm or less, more preferably 1.5 µm or less. When the average spherulite diameter is too large, the transmission of the cover layer to all light tends to decrease to, for example, 90% or less, and then the reflection luminance tends to decrease. The average spherulite diameter is measured in a film of the vinylidene fluoride base polymer by a laser small angle scattering method.

As described above, it is essential to maintain the weight ratio of the methyl methacrylate base polymer (A) to the vinylidene fluoride base polymer in the range between 55:45 and 95:5. To improve the adhesion of the cover layer to the retroreflective layer and the print layer and the resistance to edge chipping in good balance, this weight ratio is preferably from 60:40 to 90:10, more preferably from 70:30 to 80:20.

A total content of the methyl methacrylate base polymer and the vinylidene fluoride base polymer in the surface layer is preferably at least 80% by weight, more preferably at least 90% by weight based on the whole weight of all the polymer in the surface layer. When the total content is less than 80% by weight, the adhesion of the cover layer to the retroreflective layer and the print layer and the resistance to edge chipping may be deteriorated.

As explained above, the back layer is interposed between the retroreflective layer and the surface layer. In general, the back layer comprises a polymer which has good adhesion to both the retroreflective layer and the surface layer, for example, an acrylic polymer, a polyvinyl chloride polymer, a polyvinylidene chloride polymer, an ethylene-vinyl acetate copolymer and so on. Preferably, the back layer comprises the mixture of the methyl methacrylate base polymer (A) and the vinylidene fluoride base polymer (F) in the weight ratio of from 55:45 to 95:5, preferably from 60:40 to 90:10, more preferably from 70:30 to 80:20.

The methyl methacrylate base polymer and the vinylidene fluoride base polymer in the back layer have the same meanings as those used in the surface layer, and each polymer can be prepared by polymerizing the same monomer as that used in the surface layer.

A total content of the methyl methacrylate base polymer and the vinylidene fluoride base polymer in the back layer is preferably at least 80% by weight, more preferably at least 90 by weight based on the whole weight of all the polymer in the back layer. When the total content is less than 80% by weight, the adhesion of the cover layer to the retroreflective layer and the print layer and the resistance to edge chipping may be deteriorated, so that the print layer may not be formed with good adhesion.

A content of the vinylidene fluoride polymer in the back layer is preferably larger than that in the surface layer, whereby the resistance to edge chipping and the impact resistance are further increased. In this case, the content of the vinylidene fluoride in the back layer is at least 1 (one) part by weight, preferably at least 5 parts by weight larger than that in the surface layer, based on 100 parts by weight of the polymers in each layer.

A thickness of the cover layer is preferably in the range between 10 μm and 200 μm, more preferably between 30 μm and 100 μm. When the thickness of the cover layer is too small, the resistance to edge chipping and the impact resistance may be deteriorated. When this thickness is too large, the flexibility of the reflective sheet is decreased, so that it may be difficult to prevent the peeling off of the cover layer from the round edge. In the case where the reflective sheet is the encapsulated lens reflective sheet, when the thickness of the cover layer is too small, the spaces which encapsulate the plural transparent microspheres may be crushed by the deformation of the cover layer caused by external force. When the thickness is too large, the linking parts of the bonding layer may not be well adhered to the back layer of the cover layer, so that the cover layer may be peeled off from the retroreflective layer in use.

A thickness of each layer of the cover layer is suitably selected so that the thickness of the whole cover layer is in the above range. Preferably, the thickness of the back layer is larger than that of the surface layer, whereby the resistance to the edge chipping is easily improved. In this case, the thickness of the surface layer is preferably from 1 to 90 μm, more preferably from 3 to 25 μm, and the thickness of the back layer is preferably from 9 to 110 μm, more preferably from 27 to 50 μm.

In the cover layer, the back layer may have two or more layers.

The cover layer can be formed by any of conventional methods of film formation. For example, the cover layer is formed in the form of a laminate film by melt extrusion using extrusion dies for forming the respective layers.

Each layer of the cover layer may contain additives such as an antioxidant, a UV light absorber, a colorant, and so on.

Cover Layer in the Second Invention

The cover layer in the second invention comprises, in this order, a surface layer, an intermediate layer and a back layer which is present on a side facing said one of major surfaces, the surface layer comprises a methyl methacrylate base polymer as a primary component, and the intermediate layer comprises a vinylidene fluoride base polymer as a primary component.

Since the intermediate layer which is laminated on the surface layer contains the vinylidene fluoride base polymer as the primary component, it has a cushioning effect to absorb the external force which will break the surface layer. As the result, the resistance to edge chipping and the impact resistance are improved. Further, since the surface layer comprises the methyl methacrylate base polymer as the primary component, the print layer can be formed on the surface layer with good adhesion.

Since the methyl methacrylate base polymer and the vinylidene fluoride base polymer have good compatibility with each other, the surface layer and the intermediate layer can be adhered with a sufficient adhesion force for improving the resistance to edge chipping.

When the intermediate layer contains the methyl methacrylate base polymer (A) in combination with the vinylidene fluoride base polymer (F) in a weight ratio (A:F) of from 5:95 to 45:55, more preferably from 10:90 to 40:60, most preferably from 20:80 to 30:70, the resistance to edge chipping and the impact resistance are further improved preferably.

When the surface layer contains the vinylidene fluoride base polymer (F) in combination with the methyl methacrylate base polymer (A) in a weight ratio (A:F) of from 45:55 to 95:5, more preferably from 60:40 to 90:10, most preferably from 70:30 to 80:20, the adhesion of the surface layer to the print layer and the resistance to edge chipping are further improved preferably.

The methyl methacrylate base polymer and the vinylidene fluoride base polymer in the back layer have the same meanings as those used in the surface layer of the above explained first invention, and each polymer can be prepared by polymerizing the same monomer as that used in the surface layer of the above explained first invention.

The back layer is interposed between the intermediate layer and the retroreflective layer. This back layer of the second invention can achieve the same effects as those achieved by the back layer of the above explained first invention. The structure of the back layer is preferably the same as that of the back layer of the above explained first invention.

A thickness of the cover layer is preferably from 10 to 200 μm, more preferably from 30 to 100 μm by the same reason as in the first invention.

A thickness of each layer of the cover layer is suitably selected so that the thickness of the whole cover layer is in the above range. Preferably, the thickness of the intermediate layer is larger than that of the surface layer or the back layer, whereby the resistance to the edge chipping is easily improved. In this case, the thickness of the surface layer is preferably from 1 to 60 μm, more preferably from 3 to 20 μm, the thickness of the intermediate layer is preferably from 8 to 80 μm, more preferably from 24 to 35 μm, and the thickness of the back layer is preferably from 1 to 60 μm, more preferably from 3 to 20 μm.

In the cover layer, one or both of the back layer and the intermediate layer may comprise two or more layers.

The cover layer can be formed by any of conventional methods of film formation. For example, the cover layer is formed in the form of a laminate film by melt extrusion using extrusion dies for forming the respective layers.

Each layer of the cover layer may contain additives such as an antioxidant, a UV light absorber, a colorant, and so on.

Young's Modulus of Cover Layer

A Young's modulus of the whole cover layer in the first or second invention is preferably at least 350 kg/mm$^2$, more preferably from 150 to 250 kg/mm$^2$, in terms of a total value of those in a machine direction (MD) and a transverse direction (TD). When this Young's modulus is too large, the resistance to edge chipping may decrease.

Each layer of the cover layer is preferably formed from an unstretched film. Each layer made of the unstretched film can improve resistance to heat resistant dimensional stability. The unstretched film is produced so that a ratio of the Young's modulus in the machine direction (MI)) to that in the transverse direction (TD) of the whole cover layer is in the range between 0.8 and 1.25, more preferably between 0.9 and 1.1.

Print Layer

According to the present invention, the cover layer can be formed on the surface layer with good adhesion. The print layer can be formed on the surface layer by applying a printing ink which comprises a colorant such as a pigment or a dye, and at least one resin selected from thermoplastic resins, thermosetting resins and radiation curable resins, by a coating process such as gravure coating or a printing process such as screen printing. As the thermoplastic resin, an acrylic polymer is preferred, since it will further improve the adhesion of the print layer to the surface layer comprising the methyl methacrylate base polymer.

The print layer can be formed on the reflective sheet during the production step of the reflective sheet or after adhering the reflective sheet on the article. When the print layer is formed on the reflective sheet in the production step of the latter, the production process of the reflective sheet comprises either one of the following steps:

(i) laminating the retroreflective layer and the cover layer, and thereafter forming the print layer on the surface of the surface layer, or (ii) forming the print layer on the surface of the surface layer to provide the cover layer having the print layer thereon, and laminating the cover layer having the print layer thereon and the retroreflective layer.

To form the print layer by the step (ii), a reflective sheet should include a cover layer having good impact resistance as the reflective sheet of the present invention. For example, if the print layer is formed on a conventional cover layer made of a single layer film of the methyl methacrylate base polymer, which will be used in a conventional reflective sheet, minute cracks are generated on the cover layer in the printing step or a subsequent drying step of the print layer, and finally the cover layer is torn and broken. That is, in the production process of the conventional reflective sheet, the above step (ii) cannot be employed.

When the back layer of the reflective sheet of the present invention comprises the methyl methacrylate base polymer and the vinylidene fluoride base polymer in the above weight ratio, a print layer can be formed on the surface of the back layer on which the retroreflective layer is laminated, namely, a lamination side, with good adhesion.

To form the print layer on the lamination side of the back layer, the production process of the reflective sheet of the present invention includes a step for forming the print layer on the lamination side of the back layer to provide the cover layer having the print layer formed thereon like the above step (ii), and a step for laminating the cover layer carrying the print layer thereon onto the retroreflective layer.

When such back layer is used, the print layers can be provided on both the outer surface of the surface layer and the outer surface of the back layer, that is, both surfaces of the cover layer.

A printing ink which is used in the formation of the print layer on the lamination side of the back layer comprises preferably an acrylic polymer for the same reason as above.

The print layer can be formed on the lamination side of the back layer by the same method as used in the formation of the print layer on the surface layer.

Article Having Retroreflectiveness

In one of the preferred applications of the reflective sheet of the present invention, the reflective sheet is bonded to a body of an article which should have the retroreflectiveness, with bonding means.

In such case, the reflective sheet is processed by cutting or punching out in a desired size and shape before or after it is bonded to the article body with the bonding means.

With the conventional reflective sheet, minute cracks which are hardly visible are generated on the edges of the cover layer after processing, and therefore, the resistance to edge chipping is not good. Since the reflective sheet has the improved resistance to edge chipping as explained above, the present invention can provide the article having the good retroreflectiveness sufficient for practical use.

As the bonding means, any one that is used in the conventional reflective sheet, such as a double sided adhesive tape, a pressure sensitive adhesive, a heat sensitive adhesive, and so on, may be used.

When the article is used outdoors such as a plate of a traffic sign, a plate of a guidepost and so on, a pressure sensitive or heat sensitive adhesive comprising an acrylic polymer is preferably used, since the acrylic polymer can impart good weatherability, suitable tack for bonding the reflective sheet to the article body and an adhesion strength which lasts for relatively long time to the pressure sensitive or heat sensitive adhesive.

As the acrylic polymer, a copolymer comprising an alkyl acrylate (e.g. isooctyl acrylate, butyl acrylate, isobornyl acrylate, etc.) and an acid monomer (e.g. acrylic acid, etc.) is preferred. The acrylic polymer may further comprise a base monomer such as N,N-dimethylacrylamide, N,N-diethylacrylamide, N-acrylmorpholine, N-acrylpiperidine, and so on. It is preferred for the adhesive to contain a mixture of the acrylic polymer and a phenol resin, so as to increase the adhesion strength onto the article body.

Others

In the reflective sheet of the present invention, it is possible to beforehand provide the bonding means in the form of an adhesive layer on the other surface opposite the above one of the major surfaces of the retroreflective layer in the production step of the reflective sheet.

To adjust the strength of the reflective sheet as a whole, or to prevent the migration of a plasticizer from an article to the retroreflective layer when the reflective sheet is adhered to an article of a plastic containing a fairly large amount of a plasticizer, a plastic film can be interposed between the adhesive layer and the retroreflective layer.

The details of the production method of the retroreflective sheet will be explained in the examples described later.

According to the present invention, the retroreflective sheet has good adhesion of the cover layer to the retroreflective layer and the print layer so that the sheet has good practical durability and excellent resistance to edge chipping, and also it is excellent in impact resistance and weatherability.

EXAMPLES

The present invention will be illustrated by the following examples, which will not limit the scope of the present invention in any way.

Production of Retroreflective Sheet

A retroreflective sheet produced in each of Examples and Comparative Example was an encapsulated lens retroreflective sheet.

Production steps of the encapsulated lens retroreflective sheet will be explained.

(1) On a carrier web having a polyethylene layer of 25 μm in thickness, plural transparent microspheres as the lens means were partly embedded detachably in the polyethylene layer (to a depth corresponding to about 40% of a diameter of the microsphere) to form a transparent microsphere layer which was substantially a single layer of the microspheres.

(2) On a surface of the exposed part of each microsphere, a reflector comprising an aluminum vapor deposition film of about 0.1 μm in thickness was formed. In this case, a position of focus of the microsphere was substantially on an interface between the microsphere and the aluminum film.

(3) On the reflectors, a bonding layer of about 60 μm in thickness and a releasing film were laminated in this order. Thereafter, the carrier web was removed to form the microsphere layer on one of the major surfaces of the bonding layer where a part of each microsphere was embedded in the bonding layer while a surface of each microsphere which was not covered by the reflector was exposed.

(4) On the surfaces of the microspheres which were not covered by the reflectors, a film as a cover layer was placed with leaving a predetermined gap between the microsphere layer and the film. Then, on the releasing film, an embossing heater having a netform emboss pattern of thin lines was pressed with heating to emboss the bonding layer through the releasing film, whereby netform linking parts having a narrow width, which bonded the cover layer partly to the bonding layer, were formed. At this stage, the combination of the linking parts and the cover layer formed plural spaces which encapsulated the transparent microspheres.

(5) After curing the bonding layer, the releasing film was removed to expose the other major surface opposite the above one of the major surfaces of the boding layer. On the other major surface, an adhesive layer having a releasing liner was laminated to obtain a retroreflective sheet. The adhesive layer was provided as a bonding means for adhering the retroreflective sheet to an article body.

The above described method is based on the method disclosed in JP-B-61-13561.

Materials of the Retroreflective Sheet

Transparent microspheres:

Glass beads having a refractive index of about 1.9 and an average diameter of 50 to 80 μm.

Bonding layer:

The bonding layer was formed by coating a radiation curable paint, which was prepared by mixing an ethyl acrylate/methyl methacrylate/isooctyl acrylate copolymer (137 parts by weight), polyethylene glycol (200) diacrylate (20 parts by weight), rutile titanium dioxide (white pigment) (18 parts by weight), and stearic acid (2 parts by weight) in xylene, on the reflectors in the step (3). In the step (5), the bonding layer was cured by irradiation of electron beam.

Adhesive layer:

The adhesive layer contained an isooctyl acrylate/acrylic acid copolymer (a weight ratio of the monomers=94:6).

Cover layer:

The cover layer will be explained in each example.

Example 1

A retroreflective sheet of this example was produced by the above described production method using, as the cover layer, a three layer film having a surface layer, an intermediate layer and a back layer in this order, and a total thickness of 50 μm.

In this example, the surface layer contained 90 wt. % of polymethyl methacrylate and 10 wt. % of polyvinylidene fluoride and had a thickness of about 10 μm. The intermediate layer contained 10 wt. % of polymethyl methacrylate and 90 wt. % of polyvinylidene fluoride and had a thickness of about 30 μm. The back layer contained 90 wt. % of polymethyl methacrylate and 10 wt. % of polyvinylidene fluoride and had a thickness of about 10 μm.

The above film was produced by extrusion molding using an extruder according to the method disclosed in JP-A-6-80794.

As polymethyl methacrylate, a polymethyl methacrylate resin HBS 001 (a trade name of Mitsubishi Rayon Co., Ltd.) was used. As polyvinylidene fluoride, a polyvinylidene fluoride resin having an average spherulite diameter of about 1.5 μm was used.

Physical properties of the film used as the cover layer in this example are shown in Table 1. The tensile strength, elongation at break and Young's modulus of the cover layer were measured according to JIS K6732, and the whole light transmission and cloudiness of the cover layer were measured according to JIS K6714.

The results of evaluation of the retroreflective sheet produced in this example are shown in Table 2. The evaluation methods are explained below. In the subsequent examples, the evaluation was carded out by the same methods.

Impact Resistance

To a surface of an aluminum plate having sizes of 150 mm×70 mm×1 mm, the retroreflective sheet having an area slightly larger than that of the aluminum plate was adhered using a hand squeeze roll applicator, and a marginal edge part was trimmed to remove a marginal part of the sheet to obtain a sample for evaluation.

At a temperature of 20° C., using a Gardner impact tester, a weight of the tester was fallen on the reflective sheet sample under the condition of 40 inch pound, and a degree of damage of the sample was observed. When the peeling was found between the cover layer and the bonding layer, or when many cracks were generated in the parts of the cover layer over the spaces encapsulating the transparent microspheres while no peeling off was found between the cover layer and the bonding layer, the result was ranked "NG" (No good). When peeling or crack was not generated, the result was ranked "OK".

Heat Resistant Dimensional Stability

A reflective sheet sample was produced in the same manner as in the impact resistance test but sizes of an aluminum plate were changed to 152 mm×152 mm×1.6 mm.

The sheet sample was kept standing in an oven maintained at 120° C. for 30 minutes and spontaneously cooled in a room temperature atmosphere. Then, an area in which the reflective sheet shrank was measured, and a percentage of that area to an ordinal area (152 mm×152 mm) was calculated and used as a criterion value of the heat resistant dimensional stability (unit: %).

Weatherability

A reflective sheet sample was produced in the same manner as in the impact resistance test. The sample was set in a Weather-O-meter and subjected to an accelerated weathering test for 2200 hours under the conditions of JIS Z9105, Item 8.4 "Sunshine Carbon Type Accelerated Weathering Test". Then, the following properties were evaluated.
(a) Luminance retention rate (unit: %)

A percentage of a reflection luminance on the reflective sheet after the accelerated weathering test to the reflection luminance on the reflective sheet measured before the accelerated weathering test was calculated. The reflection luminance was measured using a reflectometer "Model 920" (manufactured by Advanced Retro Technology).
(b) Gloss retention rate (unit: %)

A percentage of a gloss on the reflective sheet after the accelerated weathering test to the gloss on the reflective sheet measured before the accelerated weathering test was calculated. The gloss was measured using a glossmeter "GMX-202" (manufactured by Murakami Shikisai Kenkyusho Co., Ltd.).
(c) Color difference (ΔE)

Before and after the accelerated weathering test, the color difference of the reflective sheet was measured using a color difference meter "-80"manufactured by Nippon Denshoku Kogyo Co., Ltd.). A D65 light source was used, an angle of observation was 10 degrees, and the color difference was determined according to the method defined in JIS Z8730.

Adhesion of Print Layer

A reflective sheet sample was produced in the same manner as in the impact resistance test. On the sheet sample, a print layer was screen printed using a traffic sign printing ink (containing an acrylic polymer), and subjected to the following peel test:

An adhesive tape #610 (manufactured by 3M) was firmly adhered to the surface of the print layer with a squeegee, and quickly peeled off. When the print layer was peeled off from the surface of the cover layer, the adhesion was ranked "NG". When the print layer was not peeled off, the adhesion was ranked "OK". Adhesion between the cover layer and the retroreflective layer (bonding layer).

As a sample for evaluation, the cover layer used in the retroreflective sheet was used. On the lamination side of the back layer of the cover layer, a paint for the bonding layer was coated to a thickness of 10 μm, dried and cured to form a film of the bonding material. With this film, the same peel test as in the evaluation test of the adhesion of print layer was done. When the film was peeled off, the adhesion was ranked "NG". When the film was not peeled off, the adhesion was ranked "OK".

Resistance to Edge Chipping

A reflective sheet sample was produced in the same manner as in the impact resistance test, except that the adhering position of the sheet was selected so that the largest number of the spaces encapsulating the transparent microspheres were placed at the edge of the reflective sheet. The sample surface on the edge was rubbed with a finger five times in a direction from the edge to the center of the sheet. When the cover layer was chipped or peeled off to expose the transparent microspheres, the resistance was ranked "NG". When no transparent microsphere was exposed, the resistance was ranked "OK".

Example 2

In the same manner as in Example 1 except that a two layer film which consisted of a surface layer and a back layer which had the following compositions and had a total thickness of 50 μm was used, a retroreflective sheet was produced. The surface layer contained 75 wt. % of polymethyl methacrylate and 25 wt. of polyvinylidene fluoride and had a thickness of about 5 μm, and the back layer contained 70 wt. % of polymethyl methacrylate and 30 wt. % of polyvinylidene fluoride and had a thickness of about 45 μm.

The physical properties of the film used in this example are shown in Table 1, and the results of evaluation of the retroreflective sheet produced in this example are shown in Table 2.

Example 3

In the same manner as in Example 2 except that a two layer film which consisted of a surface layer and a back layer which had the following compositions was used, a retroreflective sheet was produced.

The surface layer contained 65 wt. % of polymethyl methacrylate and 35 wt. of polyvinylidene fluoride, and the back layer contained 60 wt. % of polymethyl methacrylate and 40 wt. % ofpolyvinylidene fluoride.

The physical properties of the film used in this example are shown in Table 1, and the results of evaluation of the retroreflective sheet produced in this example are shown in Table 2.

Comparative Example 1

In the same manner as in Example 1 except that a biaxially stretched single layer film of polymethyl methacrylate having a thickness of 50 μm was used, a retroreflective sheet was produced.

The results of evaluation of the retroreflective sheet produced in this example are shown in Table 2.

Comparative Example 2

In the same manner as in Example 1 except that a biaxially stretched impact resistant single layer film of an acrylic resin having a thickness of 50 μm was used, a retroreflective sheet was produced.

The used acrylic resin was a blend resin of polymethyl methacrylate and an acrylic polyphase interpolymer, which is disclosed in JP-A-61-255846.

The results of evaluation of the retroreflective sheet produced in this example are shown in Table 2.

Comparative Example 3

In the same manner as in Comparative Example 2 except that a film as the cover layer was an unstretched film, a retroreflective sheet was produced.

The results of evaluation of the retroreflective sheet produced in this example are shown in Table 2.

Comparative Example 4

In the same manner as in Example 1 except that a three layer film comprising a surface layer, an intermediate layer and a back layer which had the following compositions was used as the cover layer film, a retroreflective sheet was produced.

The surface layer contained 40 wt. % of polymethyl methacrylate and 60 wt. % of polyvinylidene fluoride, the intermediate layer contained 50 wt. % of polymethyl methacrylate and 50 wt. % ofpolyvinylidene fluoride, and the back layer contained 50 wt. % of polymethyl methacrylate and 50 wt. % of polyvinylidene fluoride.

The physical properties of the film used in this example are shown in Table 1, and the results of evaluation of the retroreflective sheet produced in this example are shown in Table 2.

Example 4

In the same manner as in Example 1 except that polyvinylidene fluoride having an average spherulite diameter of about 1.7 μm was used in the three layer film, a retroreflective sheet was produced.

The physical properties of the film used in this example are shown in Table 1, and the results of evaluation of the retroreflective sheet produced in this example are shown in Table 2.

Example 5

In the same manner as in Example 1 except that a three layer film comprising a surface layer, an intermediate layer and a back layer which had the following compositions was used as the cover layer film, a retroreflective sheet was produced.

The surface layer contained 60 wt. % of polymethyl methacrylate and 40 wt. of polyvinylidene fluoride, the intermediate layer contained 40 wt. % of polymethyl methacrylate and 60 wt. % of polyvinylidene fluoride, and the back layer contained 60 wt. % of polymethyl methacrylate and 40 wt. % of polyvinylidene fluoride.

The physical properties of the film used in this example are shown in Table 1, and the results of evaluation of the retroreflective sheet produced in this example are shown in Table 2.

Example 6

In the same manner as in Example 1 except that a three layer film comprising a surface layer, an intermediate layer and a back layer which had the following compositions was used as the cover layer film, a retroreflective sheet was produced.

The surface layer contained 75 wt. % of polymethyl methacrylate and 25 wt. of polyvinylidene fluoride, the intermediate layer contained 25 wt. % of polymethyl methacrylate and 75 wt. % of polyvinylidene fluoride, and the back layer contained 75 wt. % of polymethyl methacrylate and 25 wt. % of polyvinylidene fluoride.

The physical properties of the film used in this example are shown in Table 1, and the results of evaluation of the retroreflective sheet produced in this example are shown in Table 2.

Example 7

In the same manner as in Example 2 except that a two layer film comprising a surface layer and a back layer which had the following compositions was used as the cover layer film, a retroreflective sheet was produced.

The surface layer contained 90 wt. % of polymethyl methacrylate and 10 wt. % of polyvinylidene fluoride, and the back layer contained 85 wt. % of polymethyl methacrylate and 15 wt. % of polyvinylidene fluoride.

The physical properties of the film used in this example are shown in Table 1, and the results of evaluation of the retroreflective sheet produced in this example are shown in Table 2.

TABLE 1

| Ex. No. | Tensile Strength (kg/mm²) | | Elongation at Break (%) | | Young's Modulus (kg/mm²) | | Transmission to all Light (5) | Cloudiness (%) |
| --- | --- | --- | --- | --- | --- | --- | --- | --- |
| | MD | TD | MD | TDC | MD | TD | | |
| 1 | 2.9 | 2.5 | 135 | 109 | 109 | 108 | 92.2 | 3.3 |
| 2 | 3.3 | 2.5 | 137 | 80 | 120 | 114 | 93.1 | 1.7 |
| 3 | 3.3 | 2.8 | 176 | 148 | 107 | 107 | 93.2 | 1.1 |
| 4 | 2.8 | 2.4 | 136 | 101 | 105 | 106 | 89.7 | 10.7 |
| 5 | 3.3 | 2.9 | 135 | 108 | 108 | 107 | 92.1 | 2.7 |
| 6 | 3.4 | 2.9 | 143 | 130 | 101 | 99 | 92.0 | 2.8 |
| 7 | 3.7 | 3.5 | 120 | 100 | 125 | 121 | 92.7 | 1.9 |
| C. 1 | 3.2 | 3.0 | 151 | 129 | 102 | 100 | 91.1 | 2.6 |

TABLE 2

| Ex. No. | Impact Resistance | Heat Resistance Dimensionability (%) | Weathering Test | | | | Adhesion to Cover Layer | Adhesion to Retroreflective Layer | Resistance to Edge Chipping |
| --- | --- | --- | --- | --- | --- | --- | --- | --- | --- |
| | | | Luminance Retention (%) | Gloss Retention (%) | Color Difference (ΔE) | | | | |
| 1 | OK | 98.9 | 99.5 | 100 | 0.43 | | OK | OK | OK |
| 2 | OK | 97.5 | 99.2 | 99.9 | 0.56 | | OK | OK | OK |

TABLE 2-continued

| | | | Weathering Test | | | | | |
|---|---|---|---|---|---|---|---|---|
| Ex. No. | Impact Resistance | Heat Resistance Dimensionability (%) | Luminance Retention (%) | Gloss Retention (%) | Color Difference (ΔE) | Adhesion to Cover Layer | Adhesion to Retroreflective Layer | Resistance to Edge Chipping |
| 3 | OK | 98.4 | 99.7 | 100 | 0.76 | oK | OK | OK |
| 4 | OK | 98.1 | 98.8 | 99.9 | 0.68 | OK | OK | OK |
| C. 1 | NG | 20.4 | 99.6 | 100 | 0.61 | OK | OK | NG |
| C. 2 | NG | 18.2 | 99.2 | 100 | 0.59 | OK | OK | NG |
| C. 3 | NG | 98.9 | 98.9 | 100 | 0.87 | OK | OK | NG |
| C. 4 | NG | 97.7 | 99.1 | 100 | 0.52 | NG | NG | NG |
| 5 | OK | 97.3 | 99.3 | 100 | 0.38 | OK | OK | OK |
| 6 | OK | 97.7 | 99.5 | 99.8 | 0.40 | OK | OK | OK |
| 7 | OK | 98.1 | 99.3 | 99.9 | 0.41 | OK | OK | OK |

We claim:

1. A retroreflective article that comprises:

(a) a retroreflective layer having first and second major surfaces, and (b) a cover layer juxtaposed against the first major surface, characterized in that:

the cover layer comprises a surface layer, an optional intermediate layer, and a back layer, with the provisos that: (i) when the intermediate layer is present in the cover layer the intermediate layer contains a vinylidene fluoride base polymer as a primary component, the surface layer contains a methyl methacrylate base polymer as a primary component, and the back layer contains a methyl methacrylate base polymer (A) and a vinylidene fluoride base polymer (F) in a weight ratio A:F of 55:45 to 95:5; and (ii) when the intermediate layer is absent from the cover layer, the surface layer and the back layer each comprise a methyl methacrylate base polymer (A) and a vinylidene fluoride base polymer (F) in a weight ratio A:F of 55:45 to 95:5, and the content of the vinylidene fluoride base polymer in the back layer is larger than in the surface layer.

2. The retroreflective article of claim 1, wherein said back layer comprises a methyl methacrylate base polymer (A) and a vinylidene fluoride base polymer (F) in a weight ratio A:F of from 55:45 to 95:5.

3. The retroreflective article of claim 2, wherein a content of the vinylidene fluoride base polymer in the back layer is larger than that in the surface layer.

4. The retroreflective article of claim 2 having a print layer on a side of the back layer that faces the retroreflective layer.

5. The retroreflective article of claim 1, containing the intermediate layer, which intermediate layer comprises a methyl methacrylate base polymer (A) and a vinylidene fluoride base polymer (F) in a weight ratio A:F of from 5:95 to 45:55.

6. The retroreflective article of claim 1, wherein the surface layer comprises a methyl methacrylate base polymer (A) and a vinylidene fluoride base polymer (F) in a weight ratio A:F of from 55:45 to 95:5.

7. The retroreflective article of claim 1, wherein said back layer comprises a methyl methacrylate base polymer (A) and a vinylidene fluoride base polymer (F) in a weight ratio (A:F) of from 55:45 to 95:5.

8. The retroreflective article of claim 7 having a print layer on a side of the back layer facing the retroreflective layer.

9. The retroreflective article of claim 1, wherein the cover layer transmits at least 90 of light incident thereon.

10. The retroreflective article of claim 1, wherein the retroreflective layer comprises:

a layer of transparent microspheres;

a support member in which are partially embedded;

a bonding layer having plural linking parts that are bonded to the cover layer so that spaces for encapsulating said transparent microspheres are formed between the cover layer and the bonding layer; and reflectors that are located beneath the layer of transparent microspheres.

11. The retroreflective article of claim 10, wherein the bonding layer comprises an acrylic polymer.

12. The retroreflective article of claim 1 secured to a second article.

* * * * *